Figure 1:
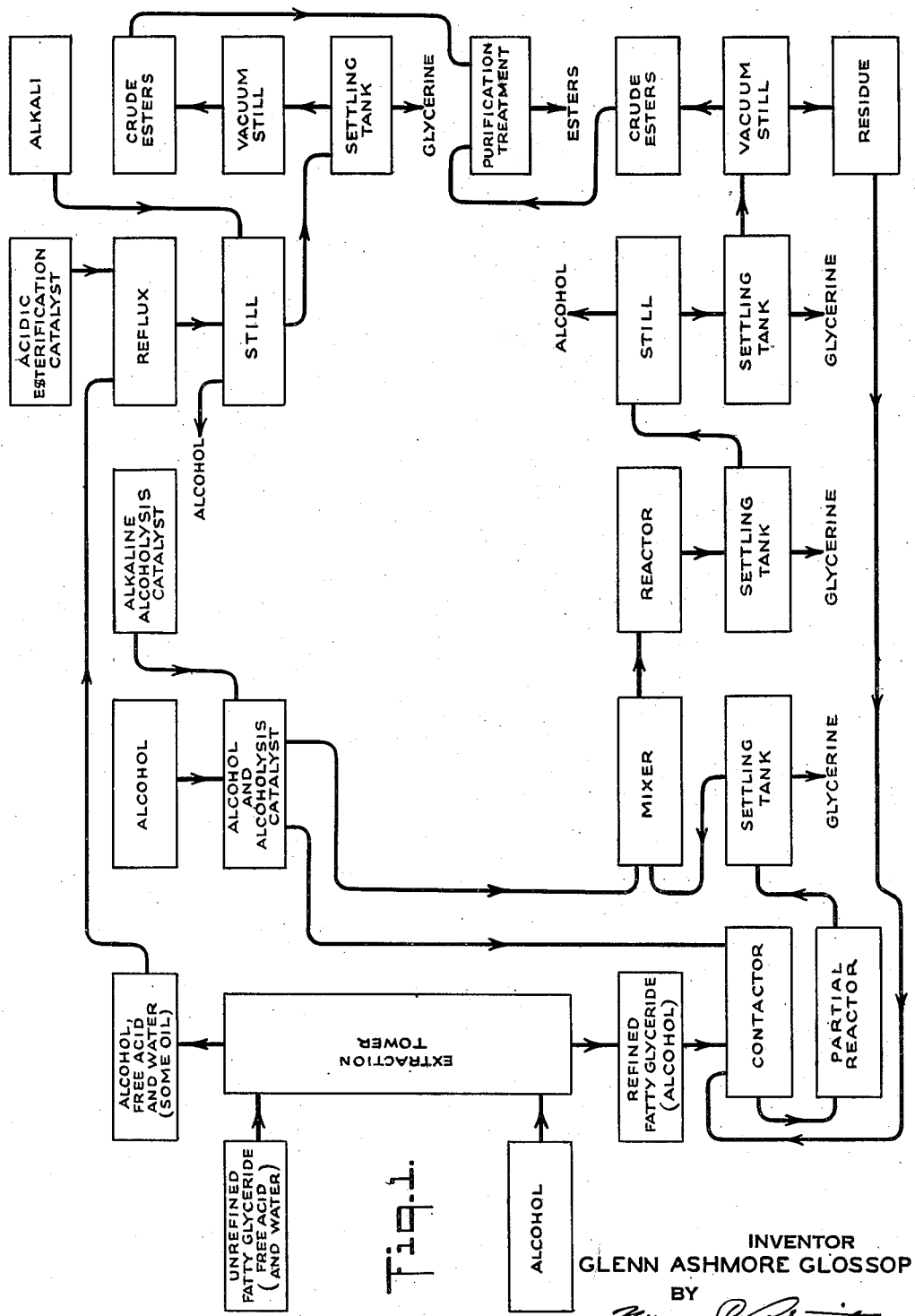

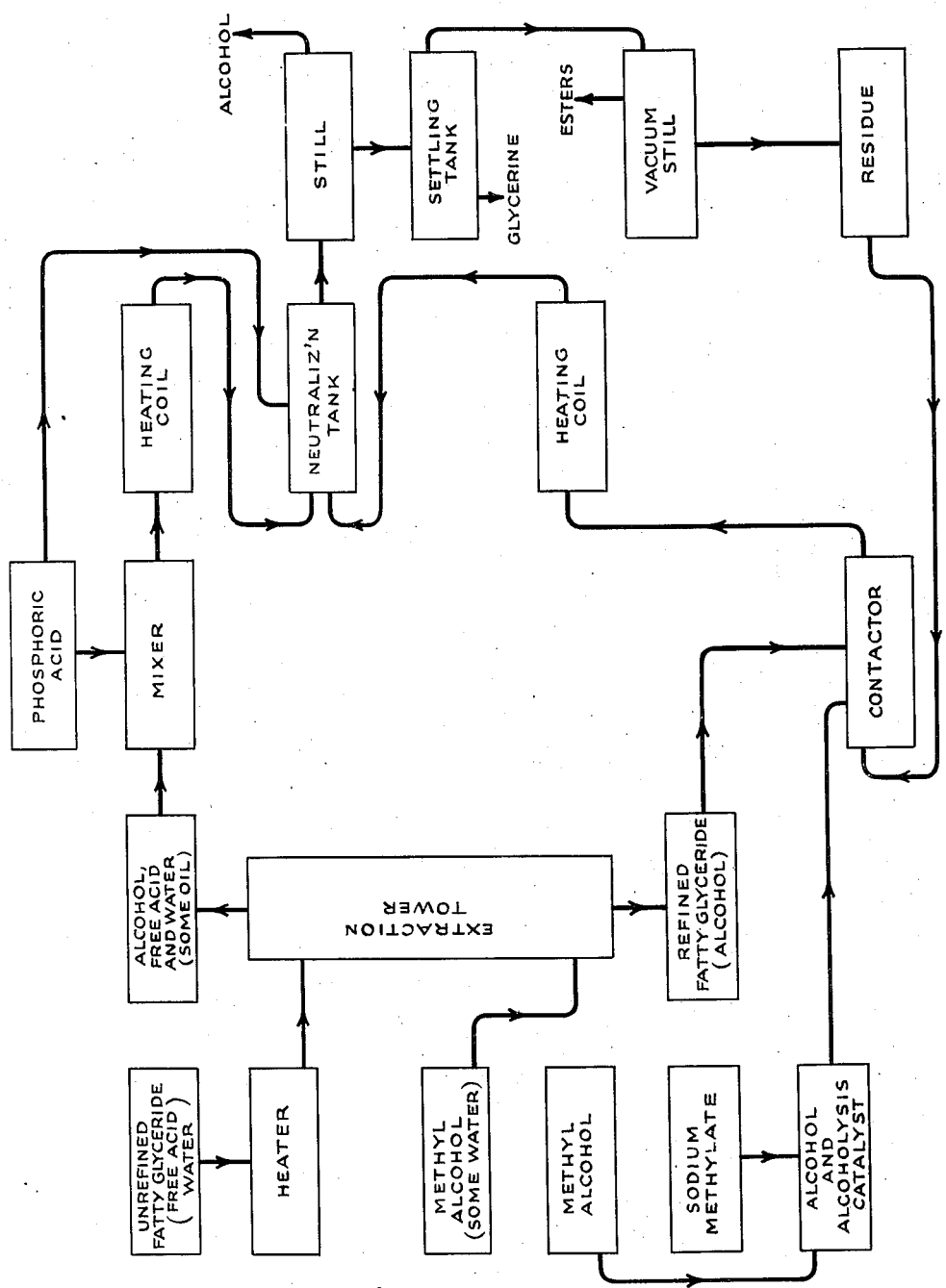

Patented Aug. 28, 1945

2,383,599

UNITED STATES PATENT OFFICE 2,383,599

TREATING FATTY GLYCERIDES

Glenn Ashmore Glossop, New York, N. Y., assignor to Colgate-Palmolive-Peet Company, Jersey City, N. J., a corporation of Delaware Application October 17, 1942, Serial No. 462,371

13 Claims. (Cl. 260—410.9)

The present invention relates to a process for pretreating fatty materials and, more particularly, to an improved process for alcoholic extraction of free fatty acids from fats and fatty oils and utilization of the extract.

Alcoholysis of fats and/or fatty oils with an alcohol in the presence of an alcoholysis catalyst to produce alkyl esters of the fatty acid and glycerine, while previously known, has only lately and because of increased glycerine demands come to be of wide commercial and industrial interest, especially to the soap-making art. This method of treating fats and fatty oils has been limited, however, by certain economical considerations resulting from the high grade of fatty oil required for economical treatment. Thus, a dry, refined oil is preferably used, as, where an alkaline catalyst is employed, such catalyst has its greatest effectiveness under anhydrous conditions and in the absence of free fatty acids. The presence of free fatty acids destroys the alkaline catalyst by converting it into soap, and, when sufficient alkaline catalyst is employed to give an excess of alkali above that destroyed by large amounts of free fatty acid present, a large amount of soap forms and gels or is otherwise objectionable.

Alkaline refining of these fatty glycerides, as with caustic alkali, though widely used, has not been found entirely satisfactory, especially where the refined oil is to be the subject of alcoholysis. Oils thus refined often contain residual water and free fatty acid because of the difficulty of achieving efficient extraction and separation with two immiscible layers of materials tending strongly to emulsify.

A convenient method of separating esters from glycerine after alcoholysis comprises resolving the mixture formed thereby into two phases and drawing off the glycerine as a lower layer. If a large amount of soap has formed, the alcoholysis mixture can be separated into two phases only with difficulty in the absence of an acidification step. If the separation can be accomplished, substantially all of the soap goes into the glycerine layer and must be recovered during the glycerine refining. When using a refined, anhydrous oil, these difficulties are largely obviated, but the refining foots are degraded in value, and some oil stocks cannot be caustic-refined economically. Alcohol has been used as a refining agent to deacidify such fats and fatty oils, but the cost of recovering the alcohol is high, and, although various methods for recovering the foots have been suggested, none, so far as is known, has been successfully carried out on an industrial scale. Indeed, Dean in his "Utilization of Fats" (1938), remarks that "the method . . . is of no value commercially."

It is an object of the present invention to provide an improved method for removing moisture and free fatty acids from fatty glycerides and for utilizing the free fatty acids removed.

It is another object of the invention to provide a novel process for utilizing the refining foots from fats and fatty oils in an economical manner.

It is also an object of this invention to provide a new method for recovering free fatty acids from fats and fatty oils before alcoholysis thereof, and for esterifying said free fatty acids for subsequent admixture of the resulting esters with esters prepared by the alcoholysis of the refined fats and fatty oils.

The invention further provides a novel pretreating step in the alcoholysis of fatty glycerides whereby the best alcoholysis yield can be obtained at lowest cost.

Other objects and advantages of the invention will be apparent from the following description, taken in conjunction with the accompanying drawings, wherein:

Figs. 1 and 2 represent flow diagrams illustrating the flow of materials in operative steps of various modifications of the invention.

According to the present invention, a fat and/or fatty oil containing free fatty acids, with or without moisture, is treated with a solvent for said free acids substantially immiscible with fatty oils, such as a lower aliphatic alcohol, e. g., methanol and/or ethanol, containing at most only a small percentage of water, using either batch, continuous concurrent, or continuous or intermittent countercurrent methods. The free fatty acids and moisture present in the oil are extracted by the solvent, and the fatty oil saturated with solvent is withdrawn.

Suitable solvents for the free fatty acids in the glycerides include lower aliphatic alcohols, especially those having 1 to about 6 carbon atoms per molecule, dioxane, Cellosolve, Carbitol, alkylamines such as trimethylamine, alkanolamines, etc. The use of a lower aliphatic alcohol for the extraction is particularly advantageous, as any part thereof remining in the glyceride is valuable in subsequent operations. Even if as much as about 5% to about 10% of water, or in certain cases as much as about 20%, is originally present in the solvent employed, the treated oil is substantially anhydrous and, thus refined and substantially devoid of water and free fatty acids, may be used directly for alcoholysis. Indeed, when using an alcohol which may be miscible with the glyceride at the operating temperature and under anhydrous conditions, such as butanol or amyl alcohol at certain temperatures, the addition of sufficient water to the alcohol to make it at least partially immiscible with the glyceride adapts the alcohol for use as a suitable solvent in the present process.

When using an alcohol as the solvent, the upper layer or extract, containing the alcohol, fatty acids, moisture and some oil, is then treated with an esterification agent and substantially completely esterified. The esterification agent employed is preferably an acid catalyst, such as sulphuric acid, organic sulphonic acids, and the like, and the esters formed, although they may be worked up separately from the main body of esters formed in the alcoholysis of the refined glyceride, are preferably mixed with the crude esters from the main body at any time before or during purification. This is especially advantageous when using an acid esterification agent in esterifying the free fatty acids and an alkaline alcoholysis agent in treating the refined oil, as, in this way, the acid and alkaline agents can be used at least partially to neutralize each other. After neutralization, the unreacted alcohol is preferably distilled off, along with other solvent, if present, leaving lower alkyl esters which may be distilled, extracted with a selective solvent and/or otherwise purified before being converted to soap or used for other purposes.

While the neutralization of an alkaline alcoholysis catalyst in the main ester body with an acid esterification agent used in the alcoholic solution of the free fatty acids is a particularly economical feature of the invention, the invention is also applicable where a process of acid alcoholysis of the oil is employed. The presence of free fatty acids in the oil results in the formation of water in the alcoholysis vessel by esterification of the fatty acids and the alcohol, and this tends to hinder the alcoholysis. Moreover, where an acid alcoholysis of the refined oil is preferred, the free fatty acids and alcohol in the extract may, if desired, be esterified through the agency of an alkaline esterification agent, such as sodium hydroxide or sodium methylate, and mixture of the two bodies results in neutralization of one agent by the other.

In selecting a fat and/or fatty oil for treatment in accordance with this invention, it is preferred to select the same from those suitable for employment by the soap-making art in any of the processes for producing soap heretofore known, especially those containing glycerides of fatty acids having about 8 to about 26, and preferably about 12 to about 20, carbon atoms per molecule. These include coconut oil, palm oil, olive oil. cottonseed oil, corn oil, tung oil, wool fat, tallow. whale and fish oils, soya bean oil, etc. The oil, unrefined and even containing moisture, is preferably treated with an aliphatic alcohol having fewer than 3 carbon atoms to the molecule, whereby two layers are formed. The lower layer, comprising the refined, acid-free oil saturated with the alcohol, is then separated from the upper layer which comprises the alcohol, free fatty acids, moisture, much of the color and some of the oil.

The refined oil containing alcohol is then treated with a small amount of an alcoholysis catalyst, adding more alcohol if desired. Short chain aliphatic alcohols, including aryl-substituted aliphatic alcohols, are preferably employed for the alcoholysis, particularly the saturated, primary alcohols, especially alcohols having a boiling point in the presence of water in excess of the azeotropic composition of lower than 100° C. at atmospheric pressure and, more particularly, the lower alcohols having 1 to about 6 carbon atoms to the molecule. Thus, alcohols satisfactory for use in forming esters with the fatty acid components of the glycerides treated include methyl alcohol, ethyl alcohol, propyl alcohol, isopropyl alcohol, n-butyl alcohol, isobutyl alcohol, tertiary butyl alcohol, the amyl alcohols, benzyl alcohol, etc. The alcoholysis catalyst may be either an alkaline or an acid agent, as aforesaid, or may be neutral. Among those which have been found suitable for use in the present process are sodium hydroxide, sodium methylate, sodium carbonate, lime, boron trifluoride, aluminum chloride, glycerine sulphate, sulphuric acid, organic sulphonic acids, organic sulphonates, etc. In general, as noted supra, it is preferred to employ an alkaline agent.

The alcoholysis may be carried out in any of several ways. It may be accomplished by adding excess alcohol and alcoholysis catalyst to the refined oil and contacting the reactants for a time sufficient for the reaction to go to substantially equilibrium conditions, thereafter separating a glycerine layer therefrom. In a preferred procedure, the alcoholysis is carried out by partially esterifying the refined oil with an alcohol in the presence of an alcoholysis catalyst to form a pool of partially reacted material containing sufficient monoglycerides and diglycerides for the reaction mixture to be substantially homogeneous. The partial esterification may be accomplished by keeping the fatty oil and the alcohol in contact in a pool for a time interval insufficient for the reaction to go to completion under the reaction conditions, as by continuously running fatty oil, alcohol and catalyst into the pool and continuously withdrawing a substantially equivalent amount of partially reacted material at a rate designed to maintain uniform conditions in the pool, and/or it may be accomplished by employing an amount of alcohol and catalyst insufficient for complete reaction with the quantity of fatty oil used. Additional reactants, whether alcohol and catalyst alone or with the fatty oil, can be added to this substantially homogeneous mixture without immediately affecting its homogeneity. The reaction is then brought nearer toward completion and, by the elapse of a sufficient time interval and/or by the introduction of additional alcohol and catalyst, proceeds past the point of homogeneity, whereby two phases appear. The mixture is then run into a settling tank to allow the glycerine layer to separate.

It is sometimes necessary, especially where the higher homologues of methyl alcohol are employed, to acidify the mixture or to distill off the unreacted alcohol before separation into two layers can result. Glycerine is withdrawn at the bottom of the settling tank, and the upper layer containing the alkyl esters and most of the alcohol, as well as monoglycerides and diglycerides, is removed at the top of the settling tank.

The glycerine separation may be carried out stepwise by introducing additional alcohol and catalyst into the upper layer containing alkyl esters and unreacted material after removal of the lower glycerine layer. The liquid mixture thus formed is thoroughly contacted and passed to another settling tank, where glycerine again settles out and is removed. Such stepwise addition of alcohol and separation of glycerine can be carried out as many times as desired before purification of the upper ester layer.

In an alternative procedure, the refined fatty glycerides are passed together with alcohol and catalyst through a contactor coil, and the mixture is run over a bank of steam coils which heat it to a liquid temperature of about 120° C. to about 130° C. The alcohol is volatilized, and the remainder of the mixture falls into a settling chamber where a lower glycerine layer can be withdrawn. If desired, the mixture may be contacted under superatmospheric pressure at about 120° C. for a short period, say about ten minutes, and the pressure may then be released to flash off unreacted alcohol. Upon distilling off alcohol, the soap formed from the catalyst generally gels if the temperature is substantially decreased. The residue may therefore be treated before cooling with a brine solution to salt out the soap or with substantially anhydrous acid to form free fatty acids and a substantially insoluble salt which may be separated by sedimentation or otherwise or may be removed with the glycerine, and the glycerine layer may be thereafter withdrawn, or, preferably, the residue may be settled while still hot and the glycerine layer withdrawn to be treated thereafter with brine or acid, as aforesaid, or otherwise.

The alcoholic solution of free fatty acids from the preliminary alcohol treatment of the refined oil is then mixed with a small amount of an esterifying agent, preferably acidic, such as concentrated sulphuric acid, organic sulphonic acids, phosphoric acid and the like, and is esterified. Any suitable method of carrying out the esterification may be employed, including refluxing the mixture with benzol or other immiscible solvent which forms a relatively low boiling azeotrope with water and cyclically distilling to remove water from the mixture while returning the benzol to the distillation vessel. In another esterification procedure, the acid esterification agent is added, the mass is refluxed for about an hour, the catalyst is neutralized, alcohol is distilled off up to a liquid temperature of about 130° C., any glycerine resulting from the acid alcoholysis of fatty oil in the extract and which appears as a lower layer is withdrawn, and the upper layer is distilled.

In an alternative and preferred procedure, the crude esters resulting from esterification of the fatty acids in the alcohol extract are mixed with the upper ester layer removed from the settling tank after alcoholysis of the main body of refined oil, and the two ester bodies are worked up together. The excess alcohol, present from both the alcoholysis procedure and the esterified extract, is removed by washing, distillation, or other suitable method, and the catalysts, which have preferably at least partially neutralized each other, are then neutralized if still present to any extent. The crude esters, thus free of alcohols, may be passed to a distillation apparatus, preferably a vacuum still, where most of the volatile matter is distilled off. The distillate is an alkyl ester fraction and, if any glycerine remains in solution in the ester layer after removal of this layer from the settling tank after alcoholysis of the refined oil, such glycerine also goes into the distillate and may be separated from the esters as a heavy lower layer. The distillation residue, containing unreacted triglycerides and partially reacted monoglycerides and diglycerides, can be returned to the alcoholysis reaction vessel, there to be reworked.

The upper layer from the settling tank may be subjected to any one or more of various purification procedures. Thus, it may be fractionally distilled to remove the lower esters, which are not as suitable for forming soaps. By conducting the distillation at subatmospheric pressures, the esters of the $C_8$ and $C_{10}$ fatty acids, if present, are topped off in a fractionating column. The esters of the $C_{12}$, $C_{14}$, $C_{16}$ and $C_{18}$ acids can be drawn off at a lower point on the column and, if desired, can be further fractionated and recombined in preferred proportions of desired components. These can then be worked up to soap, with or without other preliminary treatments, as described infra.

Another method of purification of the ester layer which may be used either alone or in combination with the fractional distillation procedure just described, with or without washing, is a liquid-liquid extraction with a selective solvent which is at least partially immiscible with the esters. A polar solvent, such as furfural, sulphur dioxide, nitromethane, methyl alcohol, ethyl alcohol, ethylene glycol, allyl alcohol, ethyl sulphate, acetaldehyde, acetamide, dichlorodiethyl ether, methyl Carbitol, etc., is employed to extract the more polar components of the ester layer, that is, the esters of the lower chain fatty acids, the more unsaturated fatty acids and the fatty acids having the greater number of hydroxy groups. In this manner, by a suitable selection of solvents, the stearic acid esters may be separated, either with or without oleic acid esters, from linoleic and linolenic acid esters and from shorter chain acid esters. A solvent for the longer chain acid esters and/or for the more saturated acid esters may be employed in admixture with the polar solvent. Thus, aliphatic, cycloaliphatic and aromatic hydrocarbons, such as pentane, cetane, cyclohexane, and benzene, may be used for this purpose. It may also be advantageous to add water to the mixture, as certain of the solvents become more selective in the wet state than in the anhydrous state.

Where such solvent extraction purification step is combined with a fractional distillation purification step, either step may follow the other, as desired. The combination of these two modes of purification has been found to provide a more complete fractionation of the ester layer into its components than is possible with either method alone. Other suitable methods of separation and purification, such as fractional crystallization, may also be employed either alone or in combination with each other and/or with either or both of fractional distillation and solvent extraction.

The ester fractions obtained according to the present invention, with or without washing and/or subsequent purification, can be employed in many chemical processes and products, as in the paint, perfumery, lubricating oils, medicinals and other fields. They may be used in various chemical syntheses, and one of their greatest outlets for volume consumption is in the soap-making industry. In saponifying the esters, they may be mixed with monoesters of polyhydric alcohols, such as ethylene glycol monostearate, propylene glycol monolaurate, trimethylene glycol monoesters of olive oil fatty acids, glyceryl alpha- (or beta-) monostearate, mannitol monoesters of coconut oil fatty acids, sorbitol monopalmitate, erythritol mono-oleate, etc. Any of these monoesters may also be admixed with di-, tri-, or poly-esters for saponification, although such modification is not preferred.

The alkaline or saponifying agent which may be used for saponifying these esters includes sodium and potassium hydroxides, carbonates, silicates, etc., methyl morpholine, piperidine, alkyl amines, alkanolamines, and other organic and inorganic bases and alkaline materials, and mixtures of these. The alkaline agent may be introduced in aqueous solution, in alcoholic solution, or in solutions of other solvents, or may be substantially anhydrous and/or substantially undiluted. The amount of solvent introduced with the alkaline or saponifying agent has a bearing on the water or organic solvent content of the finished product. The esters may be saponified by mixing with the alkaline agent in batch or continuous operation, with or without recovery of the alcohol or other solvent, as desired. The reaction may be carried out at atmospheric, superatmospheric or reduced pressures, or the materials may be reacted at somewhat elevated temperatures and then flashed into a lower pressure chamber to volatilize the alcohols, as well as some or all of any solvent (including water) employed. If desired, the esters, with or without preliminary purification, may be hydrolyzed to form the free fatty acid and an alcohol, and the free fatty acid thus produced may then be neutralized to form soap. Soap builders, inert materials, antioxidants, etc., may be admixed with the soaps by mixing them with the esters and/or the saponifying agents before contacting, by simultaneously flashing a second solution containing such adjuvant materials, and/or by mixing the final product therewith. The type of addition agent to be incorporated will depend upon the ultimate use of the new composition. The soap may be made in any desired form, such as bars, cakes, beads granules, flakes and ribbons.

The following examples described herein are merely illustrative of the present invention, and it will be understood that the invention is not limited thereto.

*Example I*

Referring to Fig. 1, unrefined coconut oil is passed into an extraction tower at a point in the upper portion thereof, and anhydrous methanol is passed into the tower at a point in the lower portion thereof. The two liquids are thoroughly contacted in the tower in continuous countercurrent flow, and the coconut oil saturated with methanol is withdrawn at the bottom in anhydrous condition and substantially devoid of free fatty acids. The coconut oil, thus refined and containing methyl alcohol, is run into a mixing vessel or contactor at a rate such that about 215 pounds of coconut oil per minute on an alcohol-free basis flows into the contactor, where it is mixed with anhydrous methyl alcohol containing solid sodium hydroxide dissolved therein in the proportion of about 1 part by weight of sodium hydroxide to 15 parts of methanol, said alcoholic solution being run into the contactor at the rate of about 16 pounds per minute. The contactor is furnished with stirring means and has an overflow outlet located at a point which allows only five minutes' run of materials to be contained in the contactor. The mixture, only partially reacted in this time and containing monoglycerides and diglycerides, passes into a time coil or partial reactor, where it remains for a sufficient time interval to permit the formation of two phases. The effluent from the partial reactor is run into a settling tank, and a glycerine layer separates out in the settling tank and is withdrawn at the bottom. The upper layer, containing alkyl esters, unreacted alcohol and partially reacted glycerides, overflows at the top of the tank into a mixing vessel where it is mixed with about 20.5 pounds per minute of the alcoholic solution of sodium hydroxide described supra. The effluent from the mixer flows into a reactor, where the materials are agitated for about fifteen minutes, and they are then run to a second settling tank, where a second glycerine layer is withdrawn. The upper layer is run into a still and is there partially distilled to remove alcohol therefrom. The residue passes to a supplementary settling tank, from which a layer of glycerine is withdrawn. The overflow from the settling tank passes to a fractional distillation apparatus where the crude esters are distilled off under reduced pressure. The distillation residue is run back into the contactor along with fresh quantities of refined coconut oil from the extraction tower, there to be reworked.

Returning to the extraction tower, the alcohol extract containing free fatty acids and moisture removed from the coconut oil, as well as a small amount of oil, is withdrawn at the top of the tower and is passed into one of a battery of batch reflux stills. A small amount of concentrated sulphuric acid is added to the content of the still as an esterifying agent, and the mass is heated to the boiling-point for about an hour. The catalyst is then substantially exactly neutralized with alkali, and the alcohol is distilled off. The distillate is run into a settling tank, where any glycerine resulting from alcoholysis of coconut oil present in the alcohol extract is withdrawn as a lower layer. The upper layer overflows into a conduit and is delivered thereby to a vacuum still. The methyl esters are then recovered by distillation and are combined with the crude esters produced by alcoholysis of the refined coconut oil. The esters are thereafter purified by known methods.

*Example II*

Unrefined cottonseed oil is heated to about 40° C. and passed, as shown in Fig. 2, into the upper part of an extraction tower. Methyl alcohol containing about 3% moisture is passed into the lower portion of the tower, and the two liquids are thoroughly contacted countercurrently. The cottonseed oil, saturated with methyl alcohol and substantially free of moisture and free fatty acids, is withdrawn from the bottom of the tower and is run into a mixing vessel or contactor at a rate of about 300 parts by weight per minute. Anhydrous methyl alcohol containing about 2 parts by weight of sodium methylate to 25 parts of methyl alcohol is also run into the mixing vessel and contacted with the refined oil at a rate of about 27 parts per minute. The resulting mixture is agitated for about five minutes and passes into a heating coil where it is raised in temperature to about 100° C. and is subjected to turbulent agitation for about five minutes.

The alcohol extract from the tower, containing moisture, free fatty acids and some oil, is removed from the top of the tower and is mixed in a mixer with about 1% by weight of phosphoric acid. The mixture is passed into a heating coil and its temperature is raised to about 100° C. while it is turbulently agitated for about five minutes. The effluents from the two coils are passed into a neutralization tank, where the two liquids are thoroughly agitated and the phosphoric acid partially neutralizes the alkaline alcoholysis catalyst, and additional phosphoric acid is run into the tank. The rate of addition of the phosphoric acid is controlled by a pH meter so that the material flowing from the tank is substantially neutralized.

The neutralized mixture is run into a combination distillation and settling tank where it flows over a closed steam coil having a steam presssure of about 20 pounds gauge per square inch. The liquid is thereby heated to about 125° C., and alcohol is vaporized off and can be recovered. The residual mixture flows into the lower part of the tank, where it separates into two layers. The lower glycerine layer is withdrawn at the bottom, and the upper layer is run into a vacuum still. Methyl esters of the cottonseed oil fatty acids are topped off, and the bottoms comprising unreacted oil and partially reacted glycerides are returned to the contactor, there to be reworked with freshly refined oil and methyl alcohol.

*Example III*

Tallow having about 34% of free fatty acid (determined as oleic acid) and a color of 41 F. A. C. according to the standards of the Fat Analysis Committee of the American Oil Chemists Society [see their publication, "Standard Methods for the Sampling and Analysis of Commercial Fats and Oils," page 43 (1935)] is heated to about 50° C. and run into the upper portion of an extraction tower. Ethyl alcohol is run into the lower portion of the tower, and the two materials are thoroughly contacted. The refined tallow is withdrawn from the bottom of the tower, and the ethyl alcohol extract is taken off at the top, and both materials are then processed in a manner similar to that disclosed in Example II. The crude combined esters obtained are purified and saponified, and the resulting soap is equivalent in color and quality to that made by ordinary soap-making procedure from tallow having only about 5% of free fatty acid (as oleic acid) and a color of 11 F. A. C.

Although the present invention has been described with reference to particular embodiments and examples, it will be apparent to those skilled in the art that variations and modifications of this invention can be made and that equivalents can be substituted therefor without departing from the principles and true spirit of the invention. Such variations and modifications are believed to be within the scope of the present specification and within the purview of the appended claims.

I claim:

1. A process which comprises treating a fatty glyceride containing free fatty acid with a solvent for said free acid at least partially immiscible with the fatty glyceride to form two phases, separating a fatty glyceride phase from a solvent phase containing free fatty acid, and reacting the fatty glyceride with a monohydric alcohol having 1 to about 6 carbon atoms per molecule in the presence of an alcoholysis catalyst.

2. A process for the alcoholysis of fatty glycerides which comprises treating a fatty glyceride containing free fatty acid with a lower aliphatic monohydric alcohol at least partially immiscible with the fatty glyceride to form two phases, separating a fatty glyceride phase containing alcohol from an alcohol phase containing free fatty acid, and adding an alcoholysis catalyst to said fatty glyceride phase to produce a reaction between the fatty glyceride and contained alcohol.

3. A process for producing monohydric alcohol esters of fatty acids which comprises treating fatty material containing fatty glycerides and free fatty acids with a lower monohydric alcohol at least partially immiscible with the fatty glycerides to form a fatty glycerides phase containing alcohol and an alcohol phase containing free fatty acids, separating the phases, and separately reacting the fatty glycerides and the free fatty acids with lower monohydric alcohol to form fatty acid esters with the alcohol.

4. A process which comprises extracting free fatty acids from fatty material containing fatty glycerides and free fatty acids with a monohydric aliphatic alcohol having not more than 6 carbon atoms per molecule, subjecting the fatty glycerides in the raffinate to an alcoholysis reaction with monohydric aliphatic alcohol having not more than 6 carbon atoms per molecule in the presence of an alcoholysis catalyst, and catalytically esterifying the fatty acids in the extract with a monohydric aliphatic alcohol having not more than 6 carbon atoms per molecule.

5. A process which comprises extracting free fatty acids from fatty material containing fatty glycerides and free fatty acids with a monohydric aliphatic alcohol having not more than 2 carbon atoms per molecule, subjecting the fatty glycerides in the raffinate to an alcoholysis reaction with monohydric aliphatic alcohol having not more than 2 carbon atoms per molecule in the presence of an alcoholysis catalyst, and catalytically esterifying the fatty acids in the extract with monohydric aliphatic alcohol having not more than 2 carbon atoms per molecule.

6. A process which comprises treating a fatty material containing glycerides and free fatty acids with a lower aliphatic monohydric alcohol at least partially immiscible with the fatty glyceride to form a fatty glyceride phase containing alcohol and an alcohol phase containing free fatty acids, separating said phases, reacting the fatty glycerides in said glyceride phase with a lower aliphatic monohydric alcohol in the presence of an alcoholysis catalyst to produce a liquid body containing alkyl esters, alcohol and glycerine, contacting the alcohol phase with an esterification catalyst to produce a second liquid body containing alkyl esters and alcohol, and combining the alkyl esters in desired proportion.

7. A process which comprises treating fatty material containing glycerides and free fatty acids with a lower aliphatic monohydric alcohol at least partially immiscible with the fatty glycerides to form a fatty glycerides phase containing alcohol and an alcohol phase containing free fatty acids; separating the phases; reacting the fatty glycerides with a lower aliphatic monohydric alcohol in the presence of an acidic alcoholysis catalyst to produce a liquid body containing alkyl esters, alcohol and glycerine; contacting the alcohol phase with an alkaline esterification catalyst to produce a second liquid body containing alkyl esters and alcohol; combining said liquid bodies whereby the catalysts at least partially neutralize each other; and removing alcohol and glycerine from said combined bodies, whereby alkyl esters may be recovered therefrom.

8. A process which comprises treating fatty glycerides containing free fatty acids with a lower aliphatic monohydric alcohol at least partially immiscible with the fatty glycerides to form a fatty glycerides phase containing alcohol and an alcohol phase containing free fatty acids; separating the phases; reacting the fatty glycerides with a monohydric aliphatic alcohol having 1 to about 6 carbon atoms per molecule in the presence of an alkaline alcoholysis catalyst to produce a liquid body containing alkyl esters, alcohol and glycerine; contacting the alcohol phase with an acidic esterification catalyst to produce a second liquid body containing alkyl esters and alcohol; combining said liquid bodies whereby the catalysts at least partially neutralize each other; and removing alcohol and glycerine from said combined bodies, whereby alkyl esters may be recovered therefrom.

9. A process which comprises treating fatty glycerides containing free fatty acids with a lower aliphatic monohydric alcohol at least partially immiscible with the fatty glycerides to form a fatty glycerides phase containing alcohol and an alcohol phase containing free fatty acids; separating the phases reacting the fatty glycerides with a monohydric aliphatic alcohol having 1 to about 6 carbon atoms per molecule in the presence of an alkaline alcoholysis catalyst to produce a liquid body containing alkyl esters, alcohol and glycerine; contacting the alcohol phase with an acidic esterification catalyst to produce a second liquid body containing alkyl esters and alcohol; combining said liquid bodies whereby the catalysts at least partially neutralize each other; substantially neutralizing said combined liquid bodies; removing alcohol and glycerine from said combined bodies; and recovering alkyl esters therefrom.

10. A process which comprises treating material containing fatty glycerides and free fatty acids with methyl alcohol to form a fatty glycerides phase containing methyl alcohol and a methyl alcohol phase containing free fatty acids; separating said phases; adding an alkaline alcoholysis catalyst and additional alcohol to the fatty glycerides phase to produce a liquid body containing alkyl esters, alcohol and glycerine contacting the methyl alcohol phase with an acidic esterification catalyst to produce a second liquid body containing methyl esters and alcohol; combining said liquid bodies whereby the catalysts at least partially neutralize each other; removing alcohol and glycerine from said combined bodies; and recovering alkyl esters therefrom.

11. A process which comprises treating material containing fatty glycerides and free fatty acids with ethyl alcohol to form a fatty glycerides phase containing ethyl alcohol and an ethyl alcohol phase containing free fatty acids; separating the phases; adding an alkaline alcoholysis catalyst and additional alcohol to the fatty glycerides phase to produce a liquid body containing alkyl esters, alcohol and glycerine; contacting the ethyl alcohol phase with an acidic esterification catalyst to produce a second liquid body containing ethyl esters and alcohol; combining said liquid bodies whereby the catalysts at least partially neutralize each other; removing alcohol and glycerine from said combined bodies; and recovering alkyl esters therefrom.

12. A process which comprises treating material containing fatty glycerides and free fatty acids with methyl alcohol to form a fatty glycerides phase containing methyl alcohol and a methyl alcohol phase containing free fatty acids; separating the phase; adding an alkaline alcoholysis catalyst and additional methyl alcohol to the fatty glycerides phase to produce a liquid body containing methyl esters, methyl alcohol and glycerine; contacting the methyl alcohol phase with an acidic esterification catalyst to produce a second liquid body containing methyl esters and methyl alcohol; combining said liquid bodies whereby the catalysts at least partially neutralize each other; substantially neutralizing said combined liquid bodies; volatilizing methyl alcohol from said combined bodies; and separating glycerine from methyl esters.

13. A process which comprises treating material containing fatty glycerides and free fatty acids with ethyl alcohol to form a fatty glycerides phase containing ethyl alcohol and an ethyl alcohol phase containing free fatty acids; separating the phases; adding an alkaline alcoholysis catalyst and additional ethyl alcohol to the fatty glycerides phase to produce a liquid body containing ethyl esters, ethyl alcohol and glycerine; contacting the ethyl alcohol phase with an acidic esterification catalyst to produce a second liquid body containing ethyl esters and ethyl alcohol; combining said liquid bodies whereby the catalysts at least partially neutralize each other; substantially neutralizing said combined liquid bodies; volatilizing ethyl alcohol from said combined bodies whereby a glycerine phase and an ethyl esters phase are produced; and separating the glycerine phase from the ethyl esters phase.

GLENN ASHMORE GLOSSOP.